United States Patent
Yamada et al.

(10) Patent No.: US 7,369,737 B2
(45) Date of Patent: May 6, 2008

(54) HOLDER FOR OPTICAL FIBER FERRULE END FACE GRINDING APPARATUS

(75) Inventors: Kunio Yamada, Matsudo (JP); Takehiko Narita, Funabashi (JP)

(73) Assignee: Seikoh Giken Co., Ltd. (JP)

( * ) Notice: Subject to any disclaimer, the term of this patent is extended or adjusted under 35 U.S.C. 154(b) by 0 days.

(21) Appl. No.: 11/333,175

(22) Filed: Jan. 18, 2006

(65) Prior Publication Data
US 2006/0193566 A1   Aug. 31, 2006

(30) Foreign Application Priority Data
Jan. 18, 2005   (JP)   ............................ P2005-010981

(51) Int. Cl.
*G02B 6/00*   (2006.01)
(52) U.S. Cl. .......................... 385/134; 451/11; 385/85; 385/137
(58) Field of Classification Search .................... None
See application file for complete search history.

(56) References Cited

U.S. PATENT DOCUMENTS

| | | | |
|---|---|---|---|
| 6,736,551 B2* | 5/2004 | Arai et al. ..................... 385/85 |
| 7,068,906 B2* | 6/2006 | Bianchi et al. ............. 385/134 |
| 2001/0024931 A1* | 9/2001 | Buzzetti ...................... 451/11 |
| 2001/0055459 A1* | 12/2001 | Yamada et al. ............. 385/134 |
| 2003/0123837 A1* | 7/2003 | Yamamoto et al. ......... 385/137 |
| 2003/0235366 A1* | 12/2003 | Chan et al. ................... 385/38 |

FOREIGN PATENT DOCUMENTS

JP   2003-053652   2/2003

* cited by examiner

*Primary Examiner*—Michelle Connelly-Cushwa
*Assistant Examiner*—Chad H Smith
(74) *Attorney, Agent, or Firm*—Blank Rome LLP

(57) ABSTRACT

There is provided a holder for an optical fiber ferrule end face grinding apparatus that can make good use of a grinding film, in which the number of optical fiber ferrules held by the holder is greatly increased. The holder includes a holder plate including a plurality of insertion holes into which each of the ferrules is inserted. In the holder plate, the insertion holes are arranged in an area of a certain size extending from the center to the periphery thereof.

6 Claims, 16 Drawing Sheets

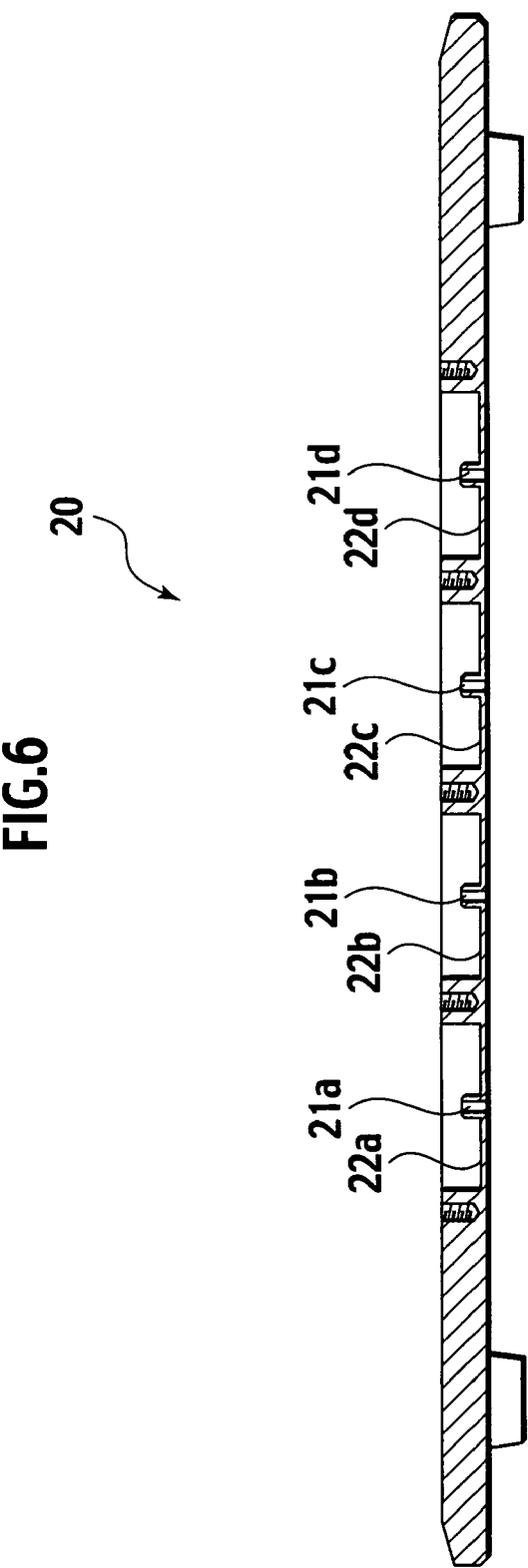

FIG.10A
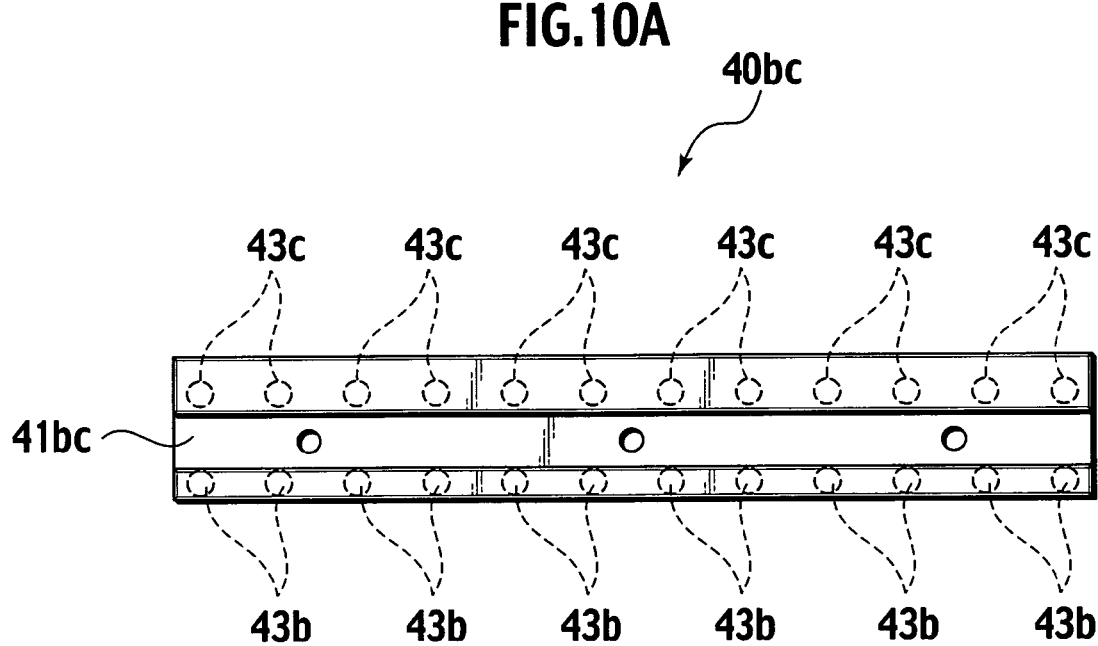
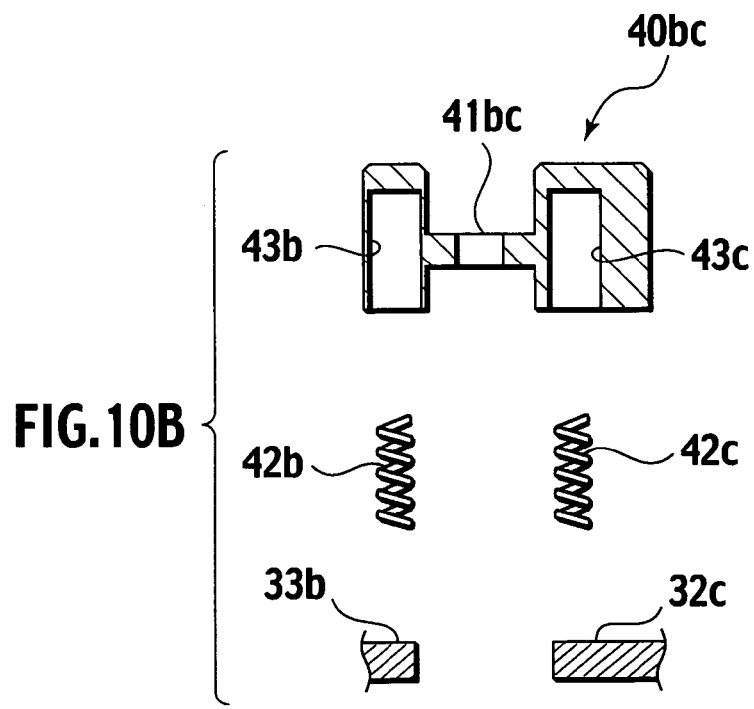
FIG.10B

FIG.11A
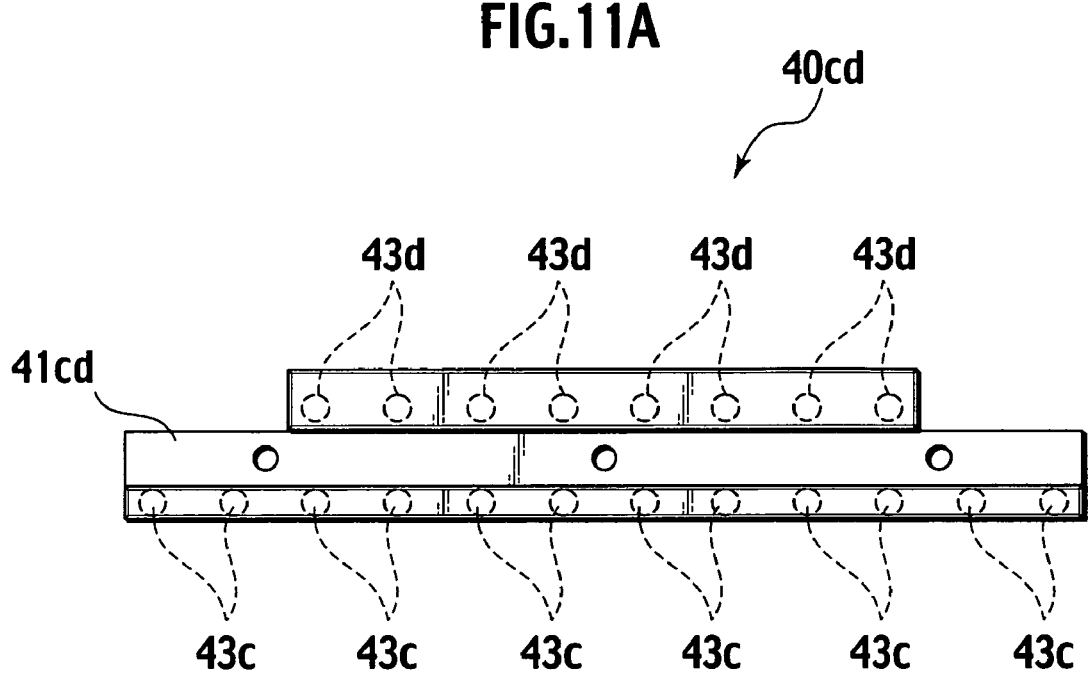
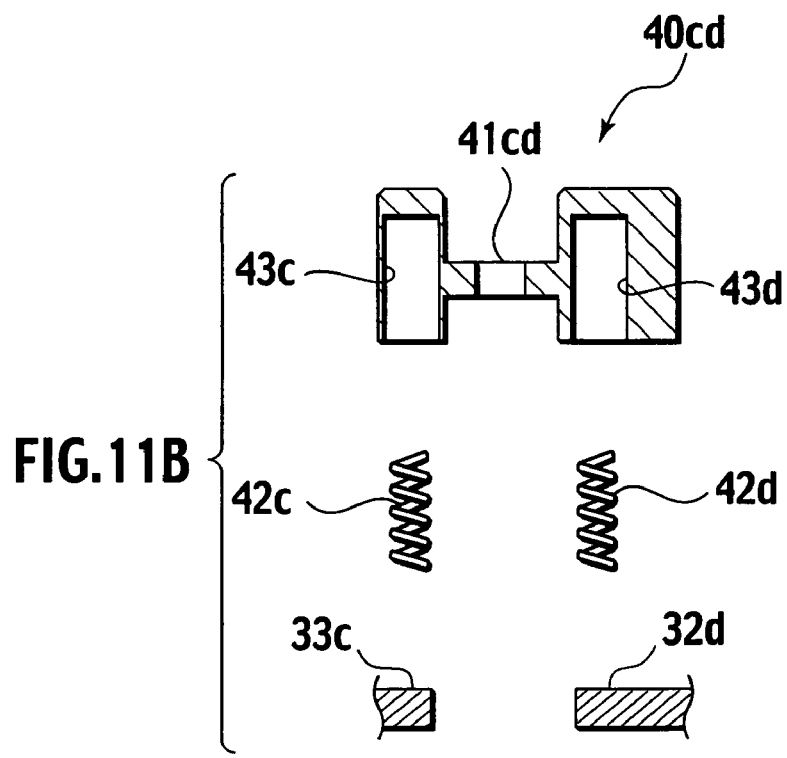
FIG.11B

HOLDER FOR OPTICAL FIBER FERRULE END FACE GRINDING APPARATUS

CROSS-REFERENCE TO RELATED APPLICATION

This application is based upon and claims the benefit of priority from the prior Japanese Patent Application No. 2005-010981, filed on Jan. 18, 2005; the entire contents of which are incorporated herein by reference.

BACKGROUND OF THE INVENTION

1. Field of the Invention

The present invention relates to a holder for an end face grinding (polishing) apparatus that simultaneously grinds a plurality of end faces of optical fiber ferrules.

2. Description of Related Art

Generally, this type of end face grinding apparatus includes a turntable that rotates horizontally, with a circular grinding film placed thereon. A holder (grinding jig) that holds a plurality of optical fiber ferrules is then mounted on the end face grinding apparatus. By turning the turntable, the end faces of all optical fiber ferrules are ground simultaneously by the grinding film.

The holder used for such an end face grinding apparatus includes a plurality of insertion holes into which each optical fiber ferrule is inserted, and holds the respective optical fiber ferrules while each optical fiber ferrule is inserted into each insertion hole and positioned therein.

Conventional holders have a plurality of insertion holes, into which each optical fiber ferrule is inserted, arranged annularly (circularly) around a round hole formed at the center, and the insertion holes are formed on the annular circumference with an equal interval. This type of holder is disclosed in Japanese Patent Application Laid-Open No. 2003-53652.

However, the conventional holder for an optical fiber ferrule end face grinding apparatus has problems as described below.

That is, as shown in FIG. 1, when a grinding film 164 is rotated with respect to the optical fiber ferrules arranged annularly on a holder 110, the grinding track on the grinding film leaves a relatively wide unused area at the center, thereby wasting this part.

Since the circumferential length of one circle is fixed, even if it is tried to arrange the optical fiber ferrules as many as possible on the circumference thereof, there is naturally a limitation.

Furthermore, since all the optical fiber ferrules follow along the same grinding track, abrasive grains only in the track portion on the grinding film wear out extremely, thereby reducing the service life of the grinding film.

These are the cause of high grinding cost per one optical fiber ferrule.

As a result of all the optical fiber ferrules following along the same grinding track, as the grinding film repeats grinding, a step appears in a boundary portion between the track portion and the unused portions at the opposite sides thereof. Due to the step in the boundary portion, nonuniform grinding force may be generated on the ferrule end face, thereby deteriorating the grinding quality.

SUMMARY OF THE INVENTION

The present invention has been achieved in order to solve the above problems. It is an object of the present invention to provide a holder for an optical fiber ferrule end face grinding apparatus that can make good use of the grinding film and can greatly increase the number of optical fiber ferrules held by the holder.

To achieve the above object, one aspect of the present invention provides a holder for an optical fiber ferrule end face grinding apparatus that holds a plurality of optical fiber ferrules, the holder including: a holder plate having a plurality of insertion holes, into which each of the ferrules is inserted, wherein the insertion holes are arranged in an area including the central part of the holder plate and extending from the central part for a predetermined range.

Another aspect of the present invention provides the holder for an optical fiber ferrule end face grinding apparatus, wherein the respective insertion holes are arranged with an equal interval along a certain direction within the area of the holder plate to form a row, and the row is arranged in a plurality of numbers adjacent to each other.

Yet another aspect of the present invention provides the holder for an optical fiber ferrule end face grinding apparatus, wherein the respective insertion holes have an angle perpendicular or inclined by an optional angle with respect to a plane of the holder plate.

Yet another aspect of the present invention provides a holder for an optical fiber ferrule end face grinding apparatus that holds a plurality of optical fiber ferrules, the holder including: a holder plate having a plurality of insertion holes, into which each of the ferrules is inserted, wherein the insertion holes are arranged in an area including the central part of the holder plate and extending from the central part for a predetermined range; and a holding member that holds each of the ferrules inserted into each of the insertion holes with respect to the holder plate.

Yet another aspect of the present invention provides the holder for an optical fiber ferrule end face grinding apparatus, wherein the holding member includes: connectors to which the ferrule is fixed in a housing of the connector, at a predetermined position where the end portion of the ferrule is protruding from the end of the connector; adapter members positioned corresponding to the respective insertion holes in the holder plate, wherein when the adapter members are positioned, the connector can be inserted into the adapter member with the end portion of the ferrule inserted into the insertion hole, and the connector can be pulled out therefrom; and a fixing member that fixes the adapter members to the holder plate at the positioned locations.

Yet another aspect of the present invention provides a holder for an optical fiber ferrule end face grinding apparatus that holds a plurality of optical fiber ferrules, the holder including: connectors to which the ferrule is fixed in a housing of the connector, at a predetermined position where the end portion of the ferrule is protruding from the end of the connector; a holder plate having a plurality of insertion holes, into which each of the ferrules protruding from the end of the connector is inserted, wherein the insertion holes are arranged in an area having a certain size including the center of the holder plate and extending from the center to the periphery thereof, with an equal interval along a certain direction to form a row, and the row is arranged in a plurality of numbers adjacent to each other; adapter members positioned corresponding to the respective insertion holes in the holder plate, wherein when the adapter members are positioned, the connector can be inserted into the adapter member with the end portion of the ferrule inserted into the insertion hole, and the connector can be pulled out therefrom; and a fixing member that fixes the adapter members to the holder plate at the positioned locations.

Yet another aspect of the present invention provides the holder for an optical fiber ferrule end face grinding apparatus, wherein each adapter member includes: a cylindrical unit to and from which the connector can be inserted and pulled out; and first and second flanges formed in front side and back side of the cylindrical unit along a direction of respective adjacent rows of insertion holes in the holder plate, when the adapter member is positioned.

Yet another aspect of the present invention provides the holder for an optical fiber ferrule end face grinding apparatus, wherein the fixing member respectively includes an energizing member that acts on an upper face of the first or the second flange of the adapter member, to press a lower face thereof against a supporting face of the holder plate on which the adapter members are positioned.

Yet another aspect of the present invention provides the holder for an optical fiber ferrule end face grinding apparatus, wherein the adapter members are arranged with an equal interval within the area of the holder plate to form a row, and the row is arranged with an equal interval corresponding to the respective insertion holes arranged in a plurality of numbers adjacent to each other, to form a row, and the row is positioned in a plurality of numbers adjacent to each other.

Yet another aspect of the present invention provides the holder for an optical fiber ferrule end face grinding apparatus, wherein the holder plate includes a plurality of seats in a groove shape, each of which accepts each of the adapter members positioned in an array corresponding to the respective insertion holes lined up in the area, for each row.

Yet another aspect of the present invention provides the holder for an optical fiber ferrule end face grinding apparatus, wherein the fixing member fixes the respective adapter members positioned in an array corresponding to the respective insertion holes lined up in the area of the holder plate, in a unit of row, to the holder plate.

Yet another aspect of the present invention provides the holder for an optical fiber ferrule end face grinding apparatus, wherein the number of insertion holes arranged in rows near the center of the area of the holder plate is relatively large, while the number thereof arranged in rows near the outside of the area of the holder plate is relatively small.

Yet another aspect of the present invention provides the holder for an optical fiber ferrule end face grinding apparatus, wherein the number of the adapter members positioned in rows near the center of the area of the holder plate is relatively large and the length of the rows is relatively long, while the number thereof positioned in rows near the outside of the area of the holder plate is relatively small and the length of the rows is relatively short.

Yet another aspect of the present invention provides the holder for an optical fiber ferrule end face grinding apparatus, wherein the fixing member includes: a relatively long fixing member that fixes the adapter members positioned in rows near the center of the area of the holder plate to the holder plate in a unit of row; and a relatively short fixing member that fixes the adapter members positioned in rows near the outside of the area of the holder plate to the holder plate in a unit of row.

BRIEF DESCRIPTION OF THE DRAWINGS

These and other objects and the configuration of this invention will become clearer from the following description of the preferred embodiments, read in connection with the accompanying drawings in which:

FIG. 6 is a cross section along line VI-VI in FIG. 5 as seen from the right side;

FIG. 10A is a plan view of a third fixing member;

FIG. 10B is a cross section of the third fixing member;

FIG. 11A is a plan view of a fourth fixing member;

FIG. 1B is a cross section of the fourth fixing member;

DETAILED DESCRIPTION OF THE INVENTION

Embodiments of the present invention will now be described with reference to the drawings.

Figure 2:
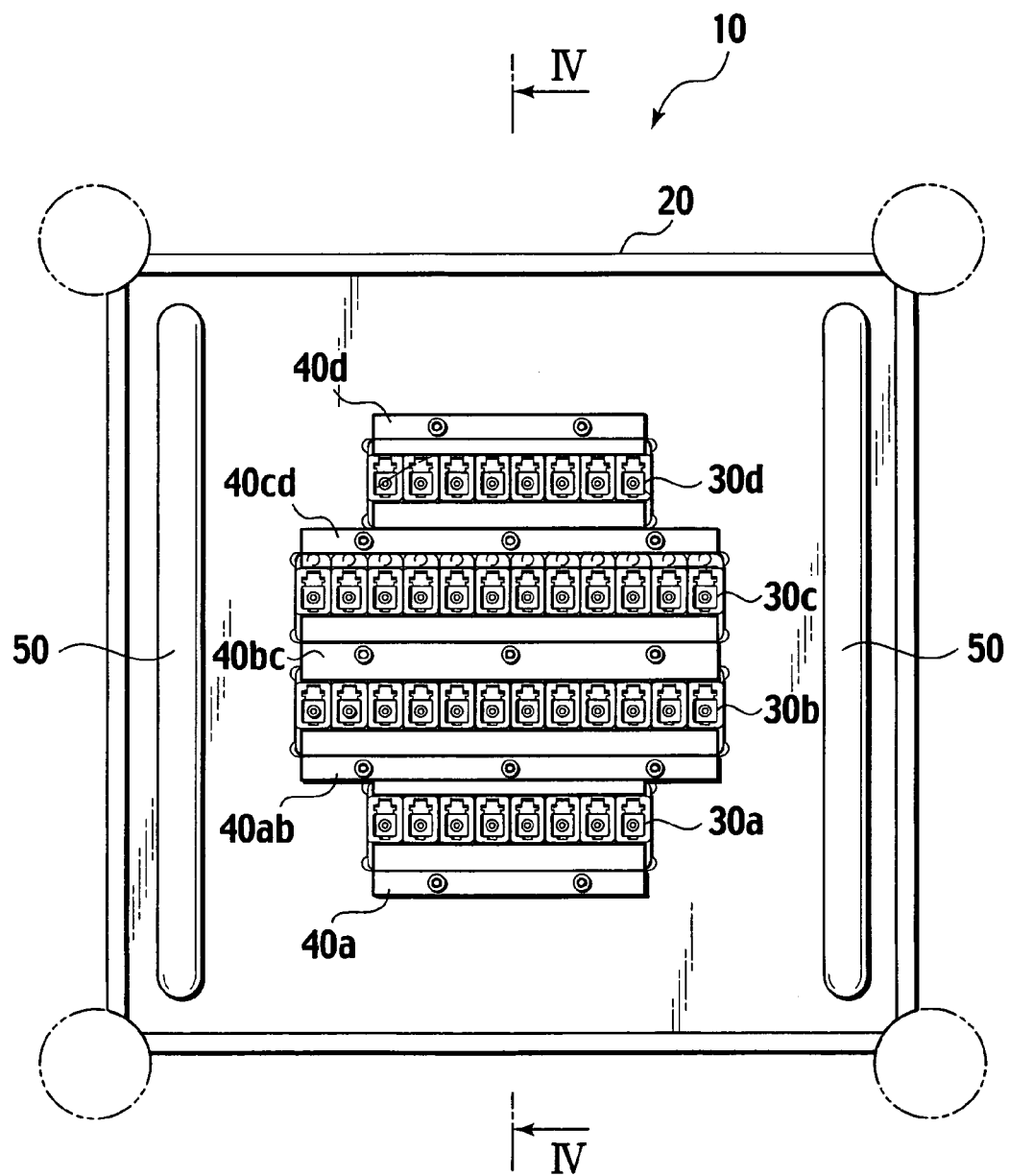
FIG. 2 is a plan view of a first embodiment of a holder for an optical fiber ferrule end face grinding apparatus.
Figure 3:
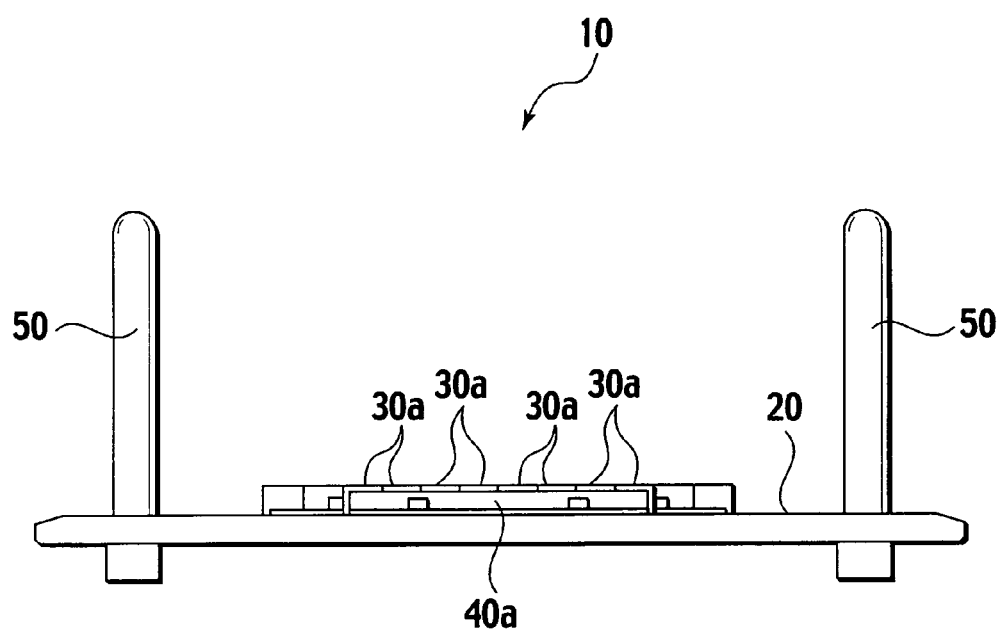
FIG. 3 is a front elevation of the holder shown in FIG. 2.
Figure 4:
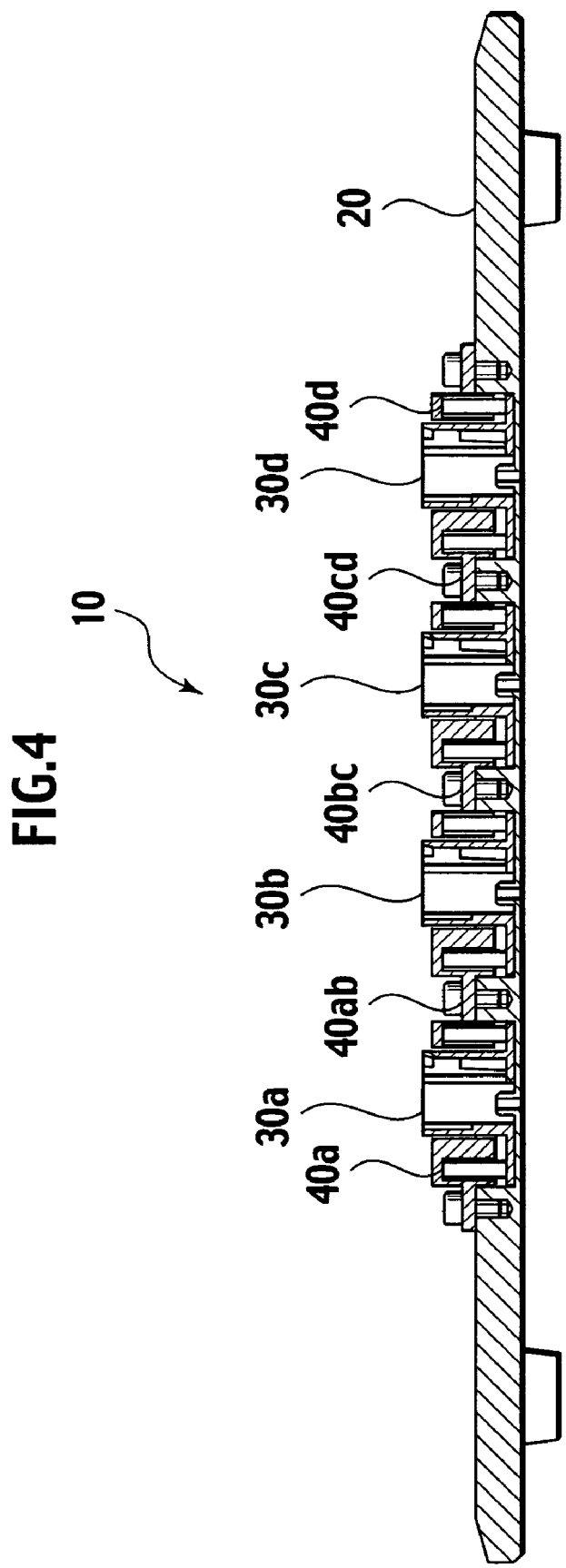
FIG. 4 is a cross section along line IV-IV in FIG. 2 as seen from the right side.

FIG. 2 is a plan view of a first embodiment of a holder for an optical fiber ferrule end face grinding apparatus according to the present invention, FIG. 3 is a front elevation, and FIG. 4 is a cross section along line IV-IV in FIG. 2 as seen from the right side. A holder 10 for an optical fiber ferrule end face grinding apparatus holds a plurality of connectors 1 (see FIG. 13) and is mounted on the end face grinding apparatus.

Figure 13:
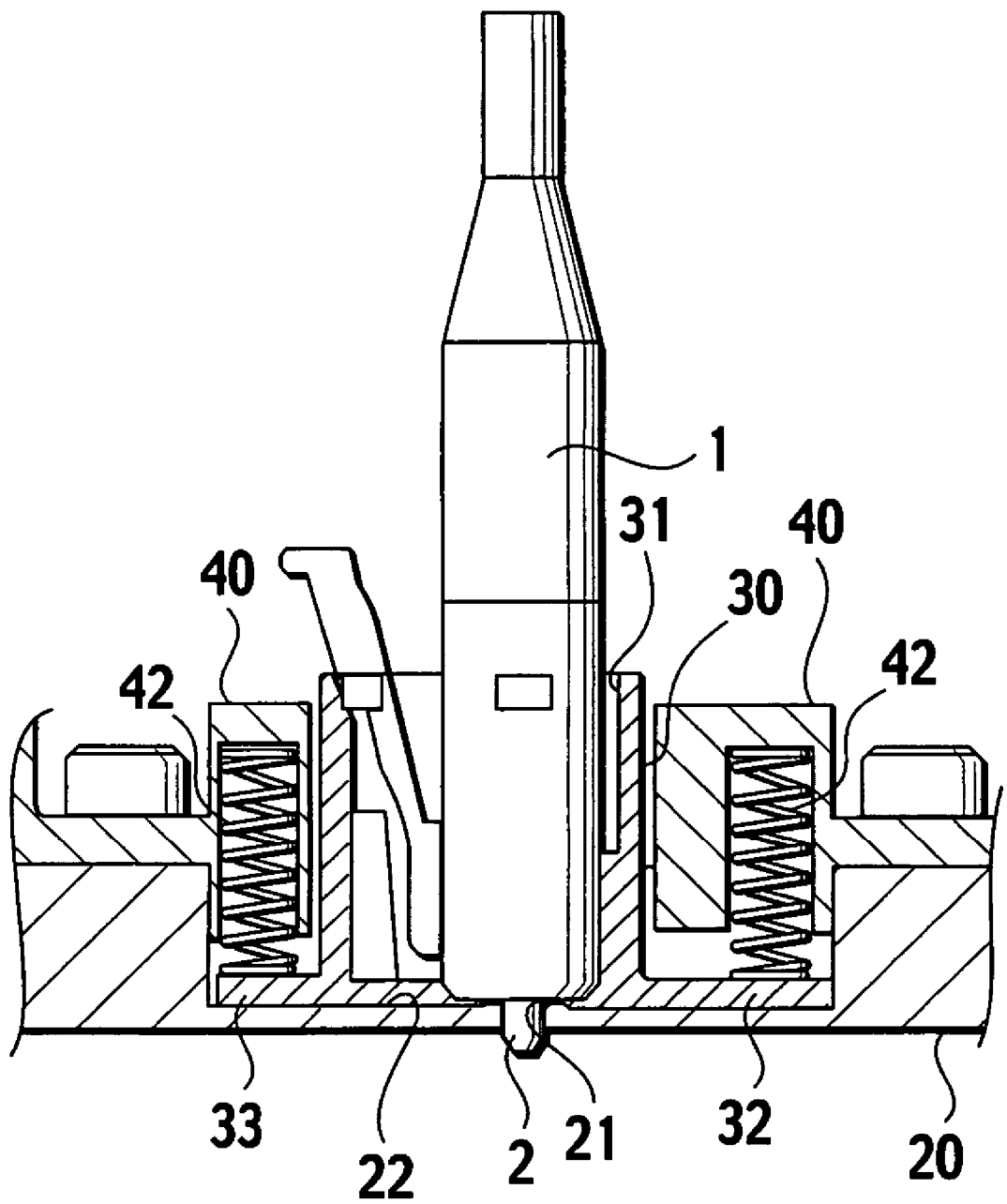
FIG. 13 is a cross section as seen from the left side in FIG. 2, indicating a state in which a connector is attached to the holder.

The connector 1, as shown in FIG. 13, fixes a ferrule 2 including one optical fiber (not shown) inserted therein, in a connector housing at a predetermined position protruded from the end of the connector and is formed as the connector.

The holder 10 for an optical fiber ferrule end face grinding apparatus includes a holder plate (holder body) 20 mounted on an optical fiber end face grinding apparatus 60, and a plurality of insertion holes 21, into which a ferrule 2 protruding from the end of the connector 1 is inserted, are formed in an area including the center of the holder plate 20.

Figure 5:
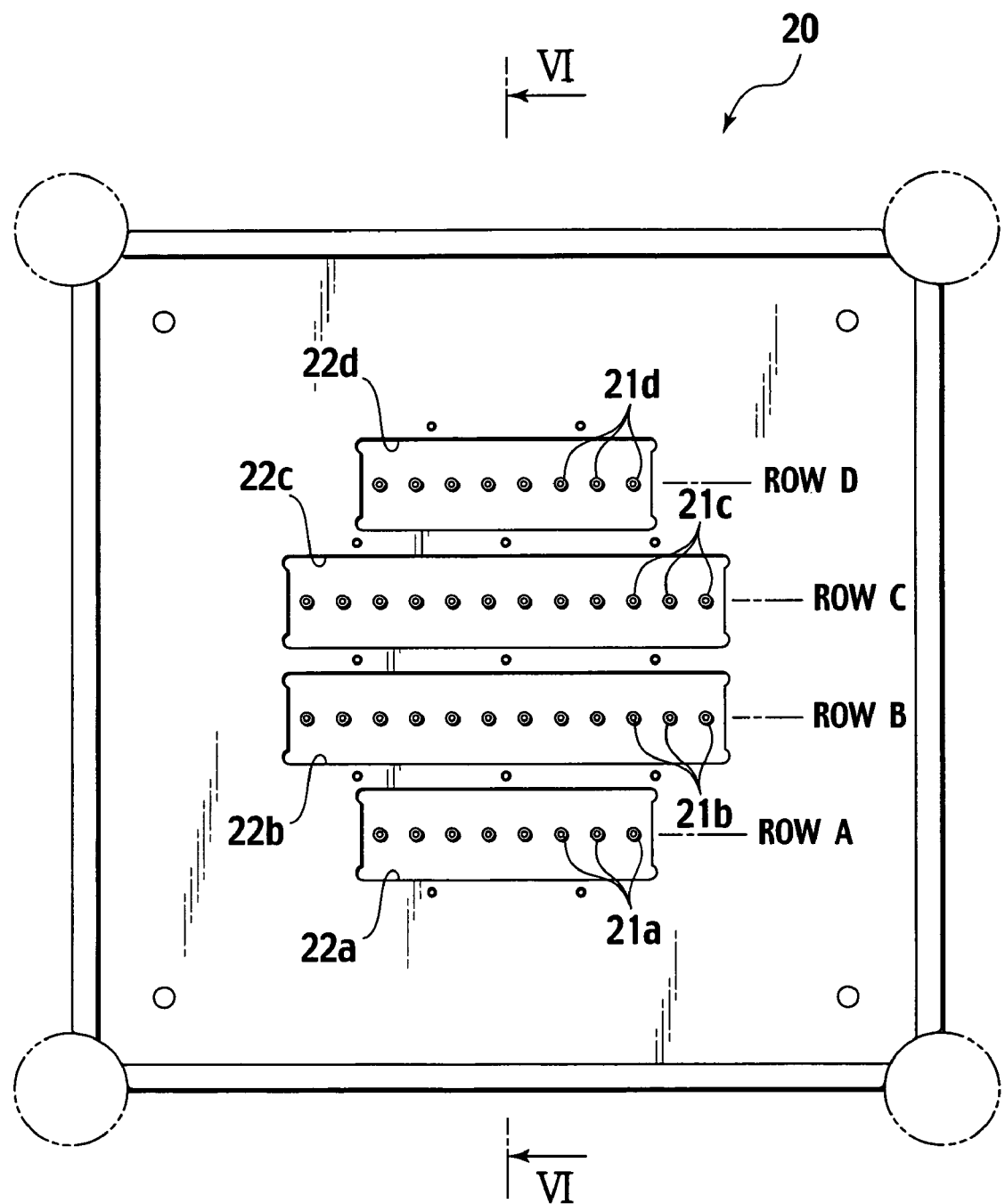
FIG. 5 is a plan view of a holder body (holder plate)

FIG. 5 is a plan view of the holder plate (the holder body) 20, and FIG. 6 is a cross section thereof along line VI-VI in FIG. 5 as seen from the right side. A plurality of insertion holes 21 into which each of the ferrules 2 is inserted are arranged in an area including the central part of the holder plate 20 and extending therefrom for a predetermined range.

In other words, a plurality of insertion holes 21 are arranged in rows on a straight line with an equal interval in the area including the central part of the holder plate 20 and extending therefrom for a predetermined range, and the rows are arranged in a plurality of numbers adjacent to each other with an equal interval.

In FIG. 5, the insertion holes 21 are arranged in four rows, that is, a row A, a row B, a row C, and a row D from the bottom (this side). Eight insertion holes 21a are arranged in the row A, twelve insertion holes 21b in the row B, twelve insertion holes 21c in the row C, and eight insertion holes 21d in the row D, respectively with an equal interval on a straight line. Forty insertion holes 21 in total are formed on the entire holder plate 20.

As shown in FIGS. 5 and 6, seats 22 in a groove shape are formed in the holder plate 20, in which insertion holes 21 are arranged with an equal interval for each row.

That is, a seat 22a in a groove shape in which insertion holes 21a of the row A are arranged, a seat 22b in a groove shape in which insertion holes 21b of the row B are arranged, a seat 22c in a groove shape in which insertion holes 21c of the row C are arranged, and a seat 22d in a groove shape in which insertion holes 21d of the row D are arranged, are formed side by side.

As shown in FIGS. 2 and 4, adaptors 30 for separately fitting respective ferrules 2 are arranged in predetermined numbers along the respective rows and fixed to the holder plate 20 by a fixing member 40 collectively for each row.

In other words, in the seat 22a in a groove shape in which eight insertion holes 21a of the row A are arranged (see FIG. 5), eight adaptors 30a for separately fitting each ferrule 2 are arranged and collectively fixed by the fixing member 40 (described later) that compresses the eight adaptors 30a against a surface of the seat 22a at a constant pressure.

In the seat 22b in a groove shape in which twelve insertion holes 21b of the row B are arranged (see FIG. 5), twelve adaptors 30b for separately fitting each ferrule 2 are arranged and collectively fixed by the fixing member 40 (described later) that compresses the twelve adaptors 30b against a surface of the seat 22b at a constant pressure.

In the seat 22c in a groove shape in which twelve insertion holes 21c of the row C are arranged (see FIG. 5), twelve adaptors 30c for separately fitting each ferrule 2 are arranged and collectively fixed by the fixing member 40 (described later) that compresses the twelve adaptors 30c against a surface of the seat 22c at a constant pressure.

Furthermore, in the seat 22d in a groove shape in which eight insertion holes 21d of the row D are arranged (see FIG. 5), eight adaptors 30d for separately fitting each ferrule 2 are arranged and collectively fixed by the fixing member 40 (described later) that compresses the eight adaptors 30d against a surface of the seat 22d at a constant pressure.

Figure 7A:
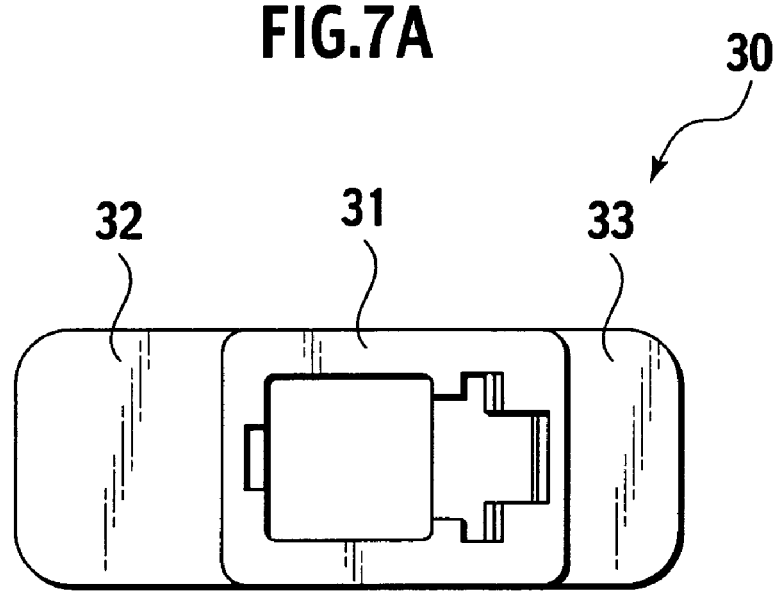
FIG. 7A is a plan view of an adaptor.
Figure 7B:
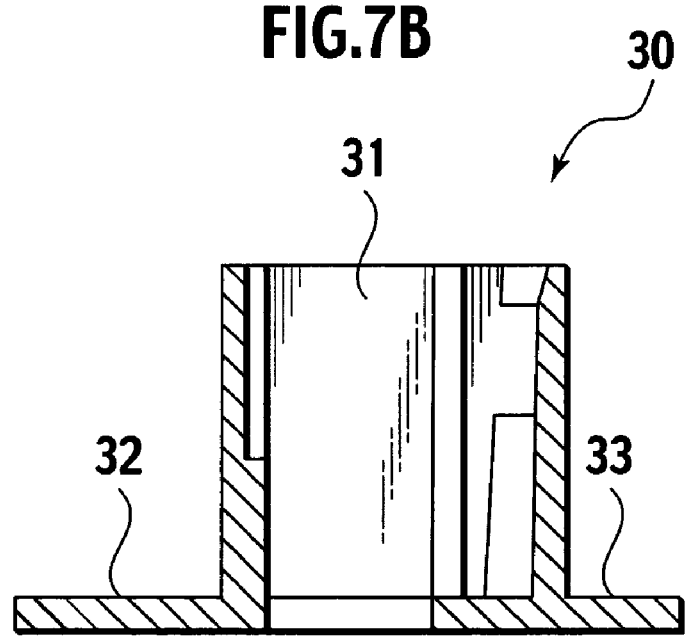
FIG. 7B is a cross section of the adaptor.

As shown in FIGS. 7A and 7B, the adaptor 30 includes a cylindrical unit 31 for housing the corresponding insertion hole 21 and also for housing and mounting the ferrule 2 when arranged in the seat 22 of the holder plate 20, and a front side flange 32 and a rear side flange 33 formed at the front side and back side of the cylindrical unit 31.

As shown in FIGS. 8A, 8B to 12A, and 12B, there are five types of fixing members 40.

Figure 8A:
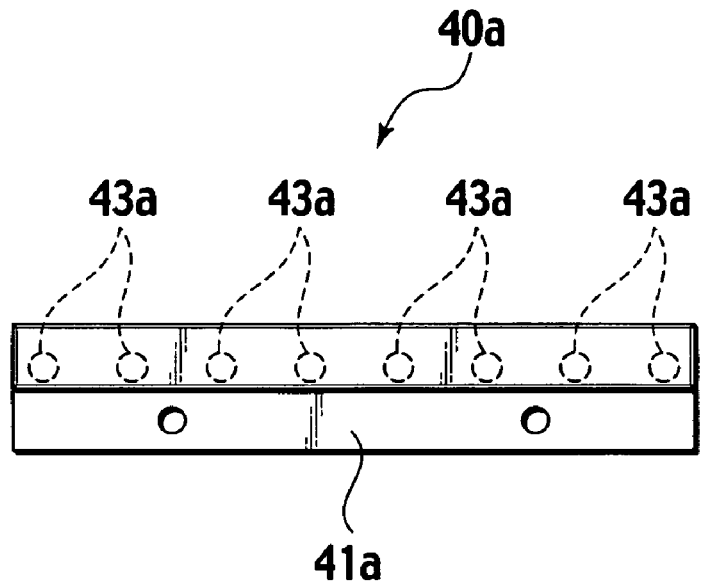
FIG. 8A is a plan view of a first fixing member.
Figure 8B:
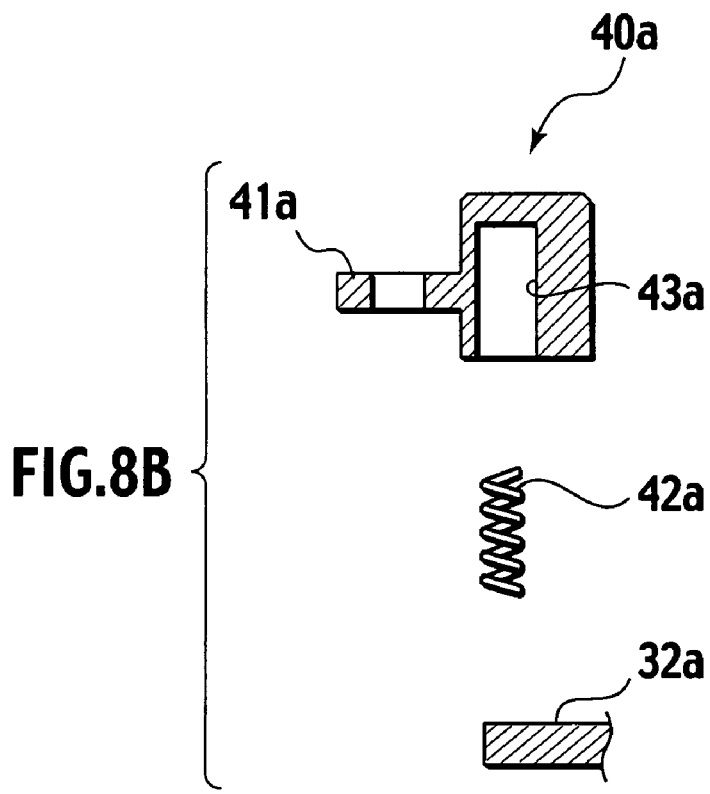
FIG. 8B is a cross section of the first fixing member.

A first fixing member 40a fixes the adaptors on the outside of the row A. In the fixing member 40a, as shown in FIGS. 8A and 8B, eight spring housing units 43a for respectively housing a compression spring 42a for pressing front side flanges 32a of the eight adaptors 30a in the row A downward are integrally formed on one side of a long fitting unit 41a screwed to the holder plate 20.

Figure 9A:
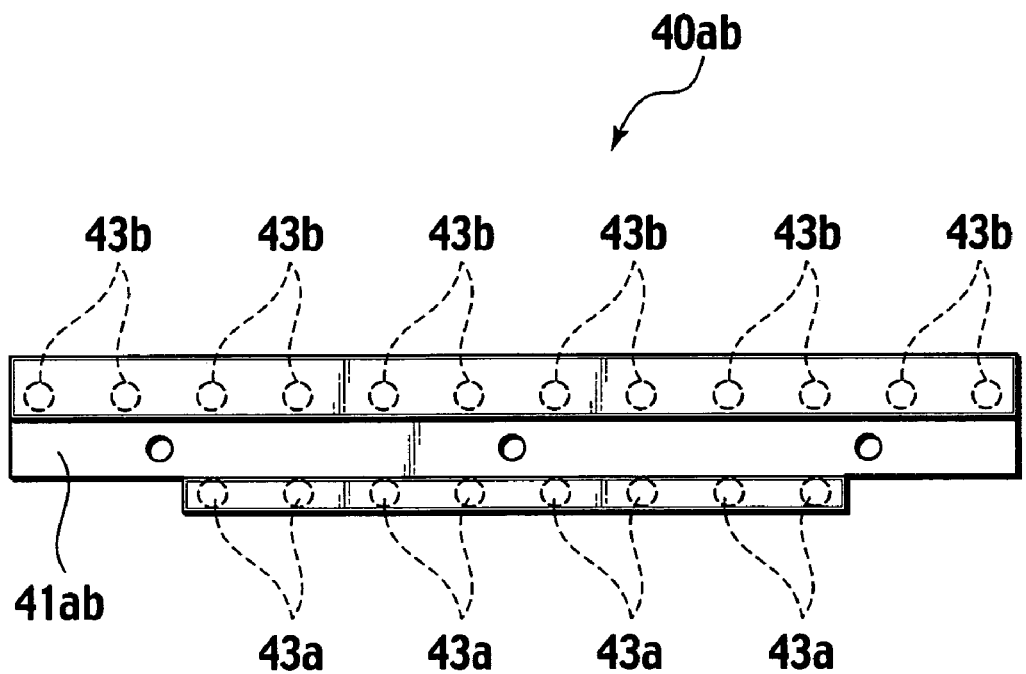
FIG. 9A is a plan view of a second fixing member.
Figure 9B:
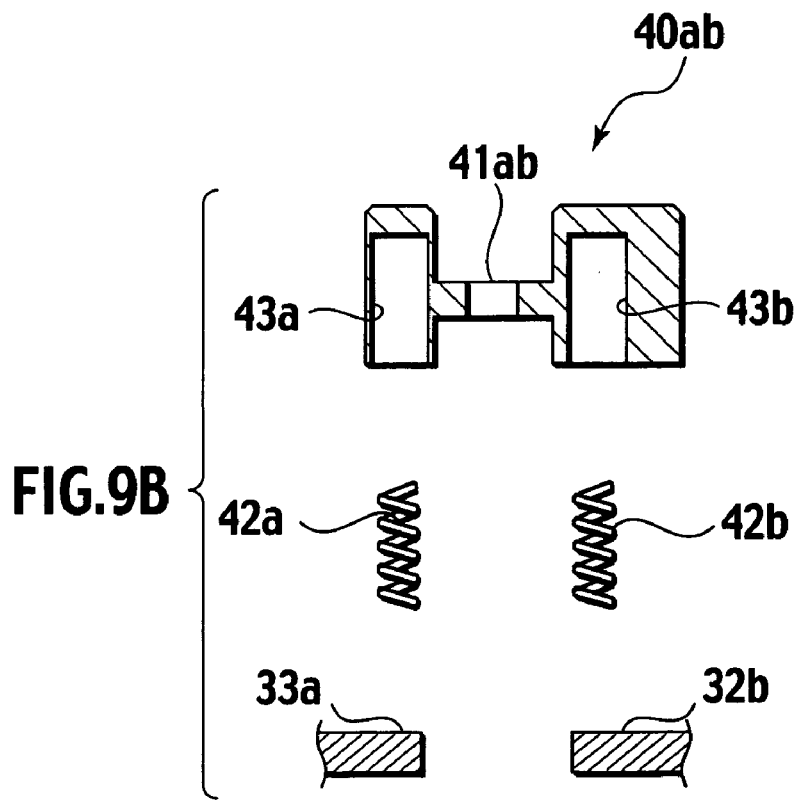
FIG. 9B is a cross section of the second fixing member.

A second fixing member 40ab fixes adaptors in two rows adjacent to each other at a boundary position between the row A and the row B. In the fixing member 40ab, as shown in FIGS. 9A and 9B, the eight spring housing units 43a for respectively housing the compression spring 42a for pressing rear side flanges 33a of the eight adaptors 30a in the row A downward, and twelve spring housing units 43b for respectively housing a compression spring 42b for pressing front side flanges 32b of twelve adaptors 30b in the row B downward are integrally formed on both sides of a long fitting unit 41ab screwed to the holder plate 20.

A third fixing member 40bc fixes the adaptors in two rows adjacent to each other at the boundary position between the row B and the row C. In the fixing member 40bc, as shown in FIGS. 10A and 10B, the twelve spring housing units 43b for respectively housing the compression spring 42b for pressing rear side flanges 33b of the twelve adaptors 30b in the row B downward, and twelve spring housing units 43c for respectively housing a compression spring 42c for pressing front side flanges 32c of the twelve adaptors 30c in the row C downward are integrally formed on both sides of a long fitting unit 41bc screwed to the holder plate 20.

A fourth fixing member 40cd fixes the adaptors in two rows adjacent to each other at the boundary position between the row C and the row D. In the fixing member 40cd, as shown in FIGS. 11A and 11B, the twelve spring housing units 43c for respectively housing the compression spring 42c for pressing rear side flanges 33c of the twelve adaptors 30c in the row C downward, and eight spring housing units 43d for respectively housing a compression spring 42d for pressing front side flanges 32d of the eight adaptors 30d in the row D downward are integrally formed on both sides of a long fitting unit 41cd screwed to the holder plate 20.

Figure 12A:
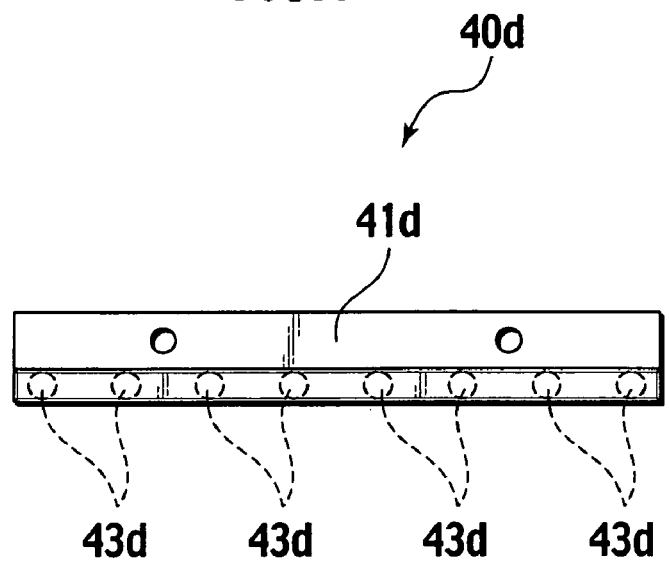
FIG. 12A is a plan view of a fifth fixing member.
Figure 12B:
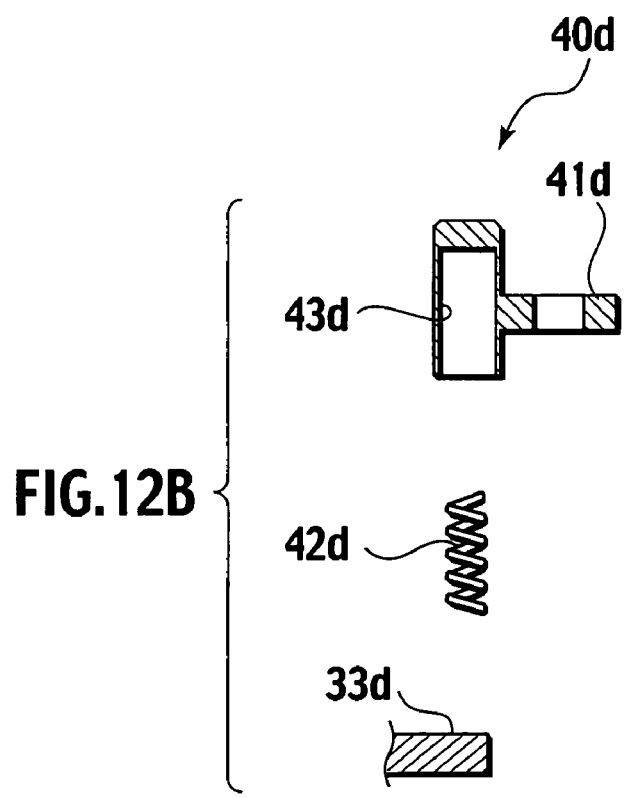
FIG. 12B is a cross section of the fifth fixing member.

A fifth fixing member 40d fixes the adaptors on the outside of the row D. In the fixing member 40d, as shown in FIGS. 12A and 12B, the eight spring housing units 43d for respectively housing the compression spring 42d for pressing rear side flanges 33d of the eight adaptors 30d in the row D downward are integrally formed on one side of a long fitting unit 41d screwed to the holder plate 20.

FIG. 13 is a cross section as seen from the left side in FIG. 2, indicating a state in which the connector 1 is fitted to the cylindrical unit 31 of the adaptor 30 while inserting the ferrule 2 protruding from the end of the connector 1 into the insertion hole 21, in the holder 10 in which the adaptor 30 is arranged in the seat 22 of the holder plate 20 and fixed by the fixing member 40.

Furthermore, the holder 10 for an optical fiber ferrule end face grinding apparatus includes, as shown in FIGS. 2 and 3, handles 50 for improving the workability when an operator mounts the holder 10 on the optical fiber end face grinding apparatus 60 by holding the holder 10 by hand, in the state that the connector 1 is fitted to the respective adaptors 30 while inserting the ferrule 2 into the respective insertion holes 21.

Figure 14:
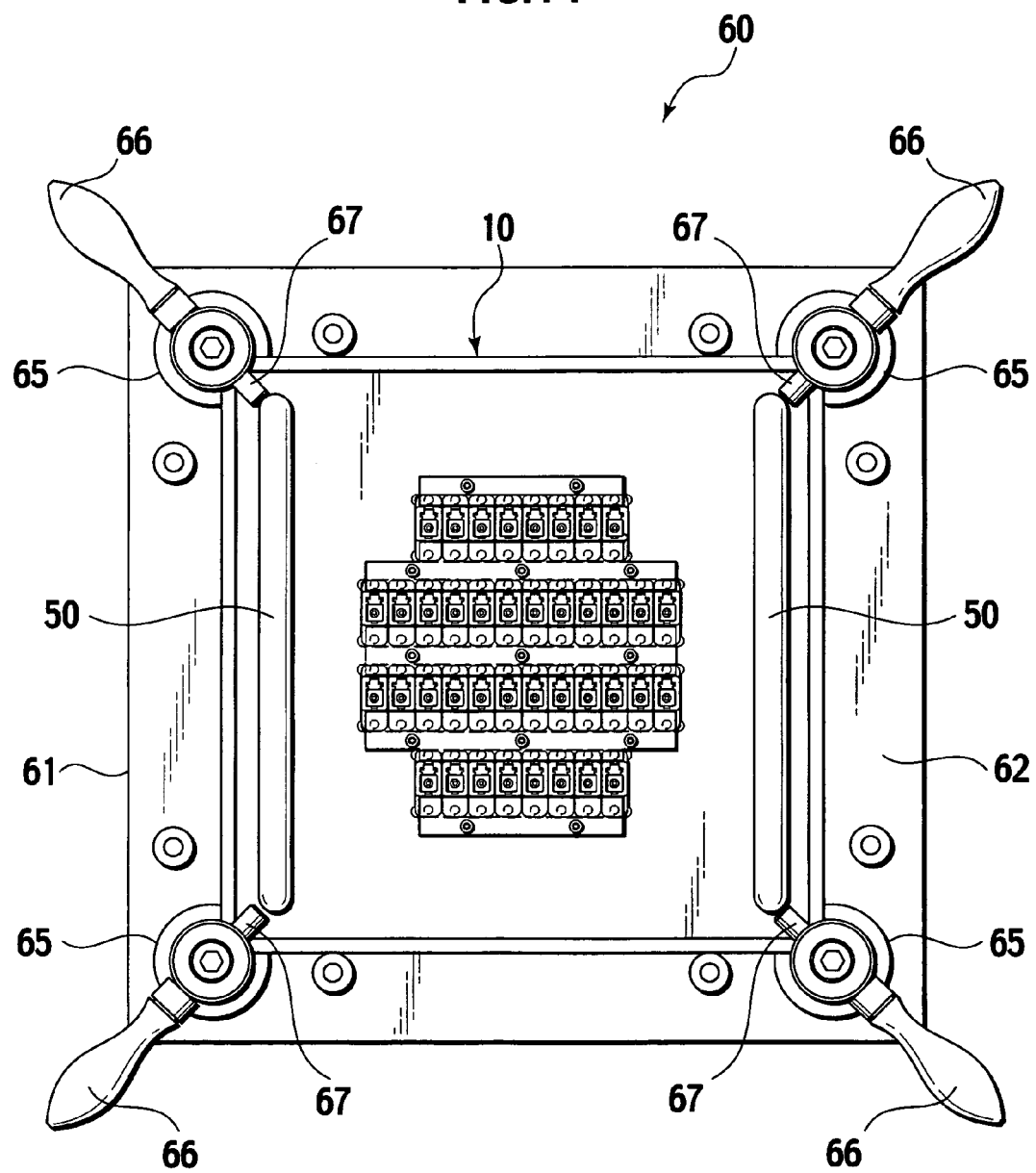
FIG. 14 is a plan view of the optical fiber end face grinding apparatus with the holder shown in FIG. 2, fitted thereto.
Figure 15:
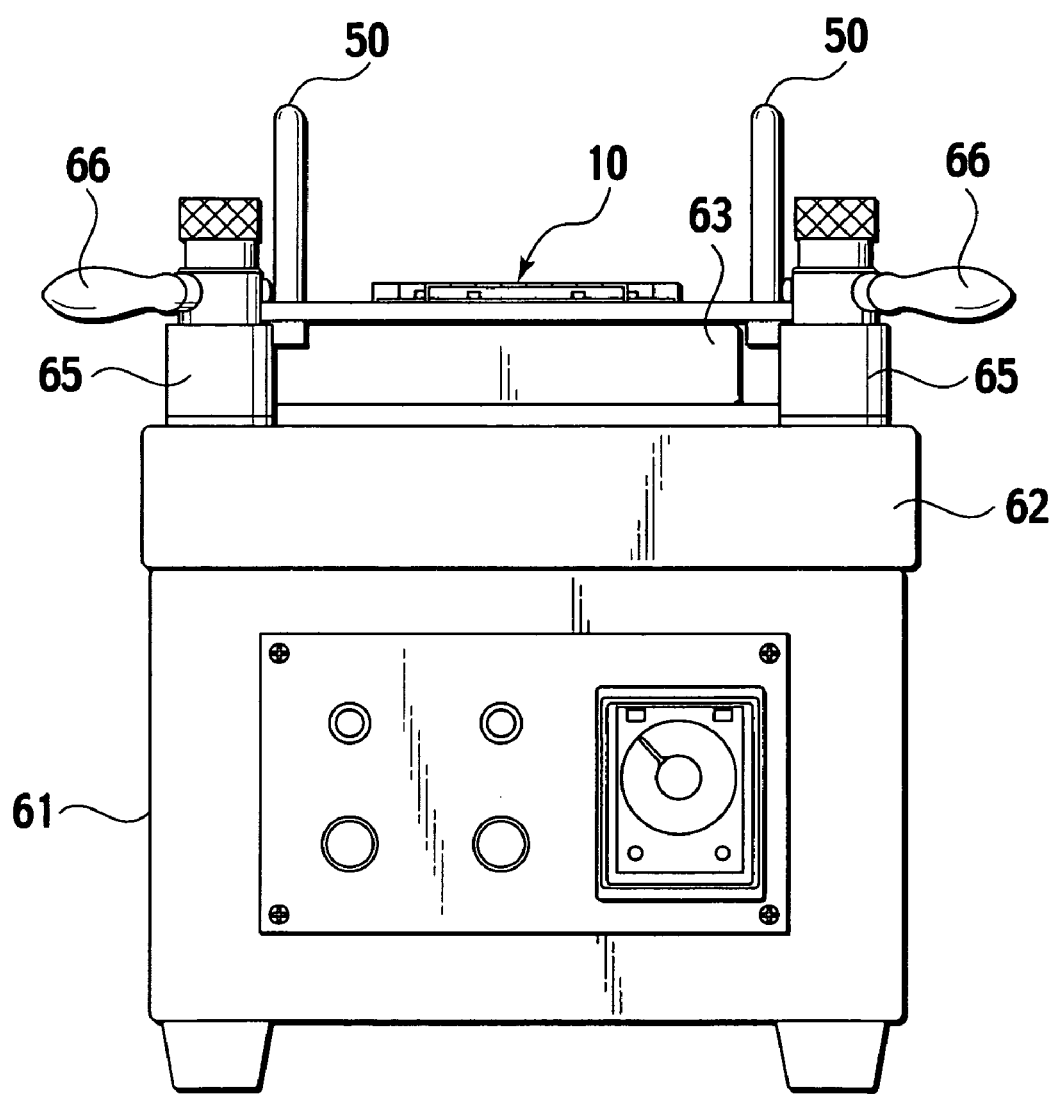
FIG. 15 is a front elevation of the optical fiber end face grinding apparatus shown in FIG. 14.

FIG. 14 is a plan view of the optical fiber end face grinding apparatus 60, on which the holder 10 for an optical fiber ferrule end face grinding apparatus is mounted, for grinding the end face (that is, the end face of an optical fiber) of the ferrule 2 held by the holder 10, and FIG. 15 is a front elevation thereof.

The optical fiber end face grinding apparatus 60 includes a turntable 63 that rotates horizontally, and is provided at the center of a square base 62 located on an upper surface of a housing 61. A grinding film 64 (see FIG. 16) is mounted on a flat upper surface of the turntable 63 via a grinding pad.

Four posts 65 are provided at four corners of the base 62, and a pressure lever 66 is installed on each of these posts 65, being compressed downward.

The size of the holder 10 is such that each of the circular arcuate edges at the four corners of the holder plate 20 is conveniently placed on the top cylindrical surfaces of each of the four posts 65. Furthermore, the orientation of a pressure pin 67 can be changed by turning the respective pressure levers 66 by hand.

Accordingly, when installing the holder 10, the pressure pins 67 are each directed outward by turning the four pressure levers 66. Then, by placing the circular arcuate edge of each of the four corners of the holder plate 20 on the top cylindrical surfaces of each of the four posts 65 and pulling upward to turn each of the pressure levers 66, the respective pressure pins 67 are pressed from above on each of the four corners of the holder plate 20, and the holder plate 20 is fixed in place.

When the holder 10 is secured in position on each of the four posts 65 of the optical fiber end face grinding apparatus 60 in this way, the height of the respective posts 65 can be adjusted so that the points of the ferrule 2 protruding from a bottom face of the holder 10 are pressed to the prescribed degree (for example, 0.1 mm) into the grinding film 64.

Figure 16:
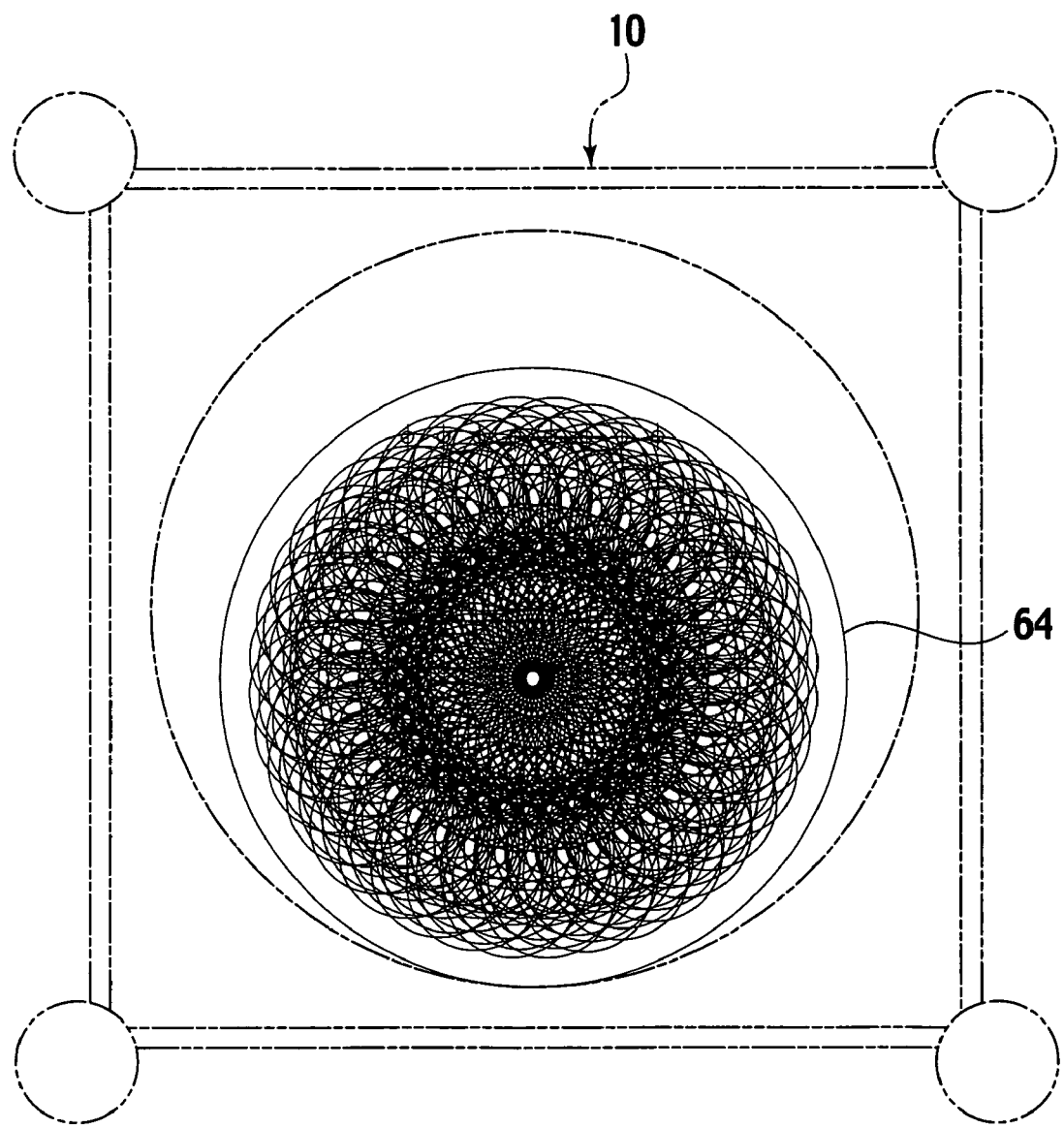
FIG. 16 is an explanatory diagram of grinding tracks on the grinding film when the holder according to the present invention is used.

FIG. 16 is an explanatory diagram of grinding tracks on the grinding film 64 when the holder according to the present invention is used.

Figure 1:
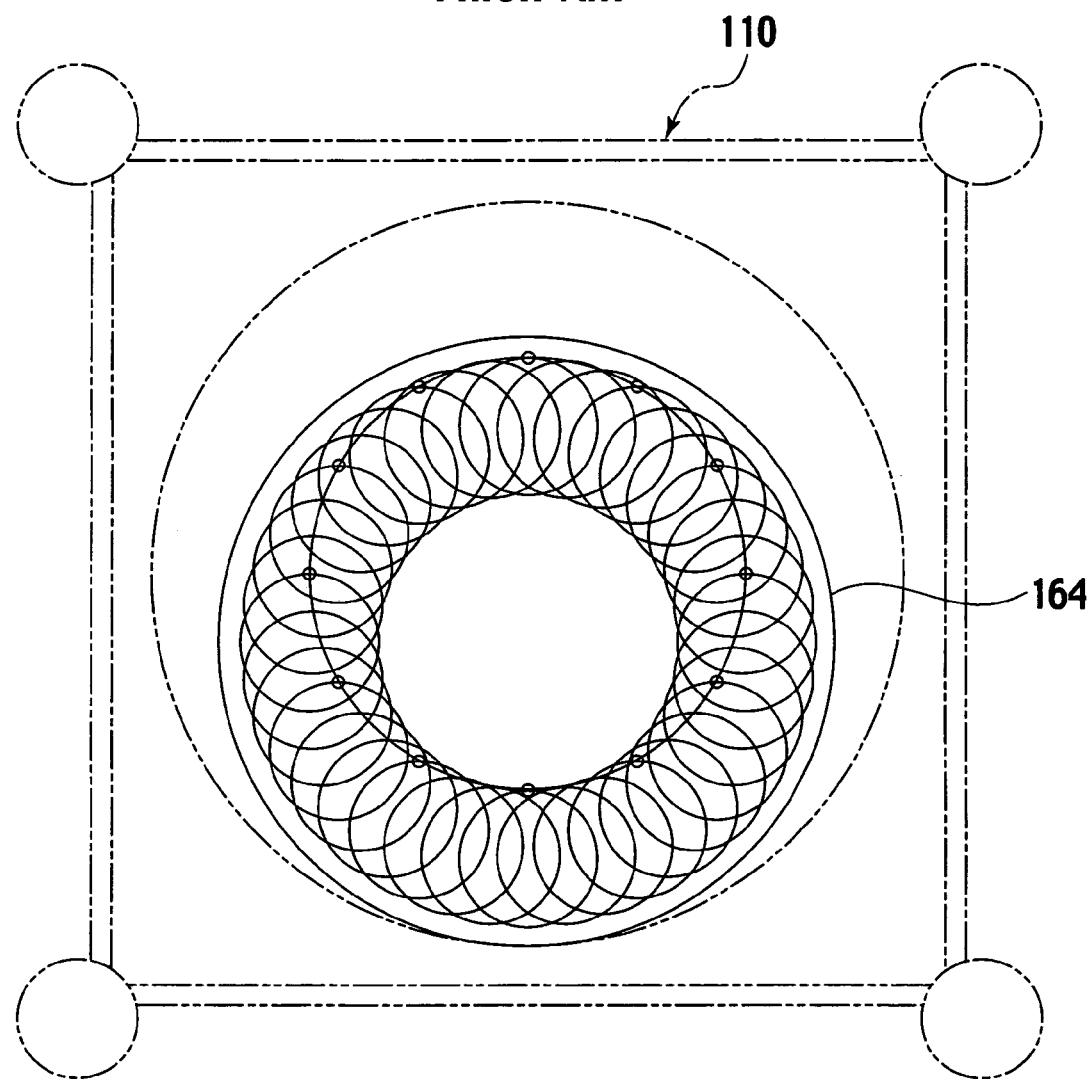
FIG. 1 is an explanatory diagram of grinding tracks on a grinding film at the time of using a conventional holder.

As shown in FIG. 16, it is seen that the whole surface of the grinding film 64 at the time of using the holder 10 is used evenly and without waste. When such grinding tracks are compared with the grinding tracks on the grinding film 164 when the conventional holder 110 is used as shown in FIG. 1, the difference is apparent.

According to the holder 10 for an optical fiber ferrule end face grinding apparatus, since the insertion holes 21, into which each of the ferrules 2 is inserted, are formed in the area including the central part of the holder body 20, as shown in FIG. 16, the whole surface of the grinding film 64 can be used evenly and without waste.

Since many ferrules 2 pass through respectively different grinding tracks, notable wear out of the abrasive grains only at a particular track on the grinding film 64 can be prevented, thereby extending the service life of the grinding film 64.

Since the ferrules 2 can be arranged at a high density on the holder 10, the number of optical fiber ferrules 2 held by the holder 10, which can be simultaneously ground, can be greatly increased.

As a result, the grinding cost per one optical fiber ferrule 2 to be ground can be reduced by using the holder 10.

Since the ferrules 2 pass through respectively different grinding tracks, even if grinding is repeated, the abrasive grains on the grinding film 64 wear out substantially evenly, therefore, the end faces of the ferrules 2 can be ground with high quality.

Furthermore, since the insertion holes 21, into which each of the ferrules 2 is inserted, are arranged with an equal interval on a straight line to form a row, and four rows are arranged adjacent to each other with an equal interval, the work direction at the time of fitting the connector 1 (ferrule 2) to the holder body 20 can be made one direction, thereby improving the workability.

In the above embodiment, the insertion holes 21 are arranged in four rows, the row A, the row B, the row C, and the row D, and the rows A and D respectively include eight insertion holes and the rows B and C respectively include twelve insertion holes, totaling to forty insertion holes. However, the present invention is not limited to this arrangement.

That is, the insertion holes 21 can be arranged in any number of rows other than four, and the number of insertion holes 21 in the respective rows can be optionally set.

The embodiment does not describe about the angle of each of the insertion holes 21 with respect to the planar surface of the holder plate 20. However, depending on the grinding angle required for the end portion of the ferrule 2 or optical fiber with respect to the planar surface of the holder plate, each insertion hole 21 can be inclined perpendicularly or to a desired angle with respect to the planar surface of the holder plate 20.

As described above, the holder for an optical fiber ferrule end face grinding apparatus according to this invention holds a plurality of optical fiber ferrules, and the holder includes a holder plate including a plurality of insertion holes into which each of the ferrules is inserted, with the insertion holes arranged in an area of a certain size extending from the central part to the periphery thereof. Accordingly, the grinding film can be used evenly and without waste. Furthermore, the number of optical fiber ferrules that can be held by the holder and ground simultaneously can be greatly increased, thereby reducing the grinding cost per one optical fiber ferrule.

While a preferred embodiment of the present invention has been described above, the foregoing description is in all aspects illustrative. It is therefore understood that numerous modifications can be devised without departing from the spirit or scope of the appended claims of the invention.

What is claimed is:

1. An optical fiber ferrule end face grinding apparatus, comprising:
a rotatable turntable;
a holder plate mounted above the turntable, having a plurality of insertion holes, and holding a plurality of optical fiber ferrules, each of which is inserted into each of the insertion holes, wherein the insertion holes are arranged in an area including the central part of the holder plate and extending from the central part for a predetermined range;
wherein the insertion holes are arranged in an area having a certain size including the center of a holder plate and extending from the center to the periphery thereof, with an equal interval along a certain direction to form a row, and the row is arranged in a plurality of numbers adjacent to each other; and
wherein the number of insertion holes arranged in rows near the center of the area of the holder plate is relatively large, while the number thereof arranged in rows near the outside of the area of the holder plate is relatively small.

2. An optical fiber ferrule end face grinding apparatus, comprising:
a rotatable turntable;
a holder plate mounted above the turntable, having a plurality of insertion holes, and holding a plurality of optical fiber ferrules, each of which is inserted into each of the insertion holes, wherein the insertion holes are arranged in an area including the central part of the holder plate and extending from the central part for a predetermined range;
wherein the insertion holes are arranged in an area having a certain size including the center of a holder plate and extending from the center to the periphery thereof, with an equal interval along a certain direction to form a row, and the row is arranged in a plurality of numbers adjacent to each other;
wherein adapter members are arranged with an equal interval within the area of the holder plate to form a row, and the row is arranged with an equal interval corresponding to the respective insertion holes arranged in a plurality of numbers adjacent to each other, to form a row, and the row is positioned in a plurality of numbers adjacent to each other; and
wherein the number of the adapter members positioned in rows near the center of the area of the holder plate is relatively large and the length of the rows is relatively long, while the number thereof positioned in rows near the outside of the area of the holder plate is relatively small and the length of the rows is relatively short.

3. An optical fiber ferrule end face grinding apparatus comprising: a rotatable turntable; a holder plate mounted above the turntable, having a plurality of insertion holes, and holding a plurality of optical fiber ferrules, each of which is inserted into each of the insertion holes, wherein the insertion holes are arranged in an area including the central part of the holder plate and extending from the central part for a predetermined range; wherein the insertion holes are arranged in an area having a certain size including the center of a holder plate and extending from the center to the periphery thereof, with an equal interval along a certain direction to form a row, and the row is arranged in a plurality of numbers adjacent to each other; wherein adapter members are arranged with an equal interval within the area of the holder plate to form a row, and the row is arranged with an equal interval corresponding to the respective insertion holes arranged in a plurality of numbers adjacent to each other, to form a row, and the row is positioned in a plurality of numbers adjacent to each other; and wherein the number of the adapter members positioned in rows near the center of the area of the holder plate is relatively large and the length of the rows is relatively long, while the number thereof positioned in rows near the outside of the area of the holder plate is relatively small and the length of the rows is relatively short; wherein a fixing member includes: a relatively long fixing member that fixes the adapter members positioned in rows near the center of the area of the holder plate to the holder plate in a unit of row; and a relatively short fixing member that fixes the adapter members positioned in rows near the outside of the area of the holder plate to the holder plate in a unit of row.

4. A holder for an optical fiber ferrule end face grinding apparatus that holds a plurality of optical fiber ferrules, the holder comprising:
    connectors to which the ferrule is fixed in a housing of the connector, at a predetermined position where the end portion of the ferrule is protruding from the end of the connector;
    a holder plate having a plurality of insertion holes, into which each of the ferrules protruding from the end of the connector is inserted, wherein the insertion holes are arranged in an area having a certain size including the center of the holder plate and extending from the center to the periphery thereof, with an equal interval along a certain direction to form a row, and the row is arranged in a plurality of numbers adjacent to each other;
    adapter members positioned corresponding to the respective insertion holes in the holder plate, wherein when the adapter members are positioned, the connector can be inserted into the adapter member with the end portion of the ferrule inserted into the insertion hole, and the connector can be pulled out therefrom; and
    a fixing member that fixes the adapter members to the holder plate at the positioned locations,
    wherein the number of insertion holes arranged in rows near the center of the area of the holder plate is relatively large, while the number thereof arranged in rows near the outside of the area of the holder plate is relatively small.

5. A holder for an optical fiber ferrule end face grinding apparatus that holds a plurality of optical fiber ferrules, the holder comprising:
    connectors to which the ferrule is fixed in a housing of the connector, at a predetermined position where the end portion of the ferrule is protruding from the end of the connector;
    a holder plate having a plurality of insertion holes, into which each of the ferrules protruding from the end of the connector is inserted, wherein the insertion holes are arranged in an area having a certain size including the center of the holder plate and extending from the center to the periphery thereof, with an equal interval along a certain direction to form a row, and the row is arranged in a plurality of numbers adjacent to each other;
    adapter members positioned corresponding to the respective insertion holes in the holder plate, wherein when the adapter members are positioned, the connector can be inserted into the adapter member with the end portion of the ferrule inserted into the insertion hole, and the connector can be pulled out therefrom; and
    a fixing member that fixes the adapter members to the holder plate at the positioned locations,
    wherein the number of the adapter members positioned in rows near the center of the area of the holder plate is relatively large and the length of the rows is relatively long, while the number thereof positioned in rows near the outside of the area of the holder plate is relatively small and the length of the rows is relatively short.

6. A holder for an optical fiber ferrule end face grinding apparatus that holds a plurality of optical fiber ferrules, the holder comprising:
    connectors to which the ferrule is fixed in a housing of the connector, at a predetermined position where the end portion of the ferrule is protruding from the end of the connector;
    a holder plate having a plurality of insertion holes, into which each of the ferrules protruding from the end of the connector is inserted, wherein the insertion holes are arranged in an area having a certain size including the center of the holder plate and extending from the center to the periphery thereof, with an equal interval along a certain direction to form a row, and the row is arranged in a plurality of numbers adjacent to each other;
    adapter members positioned corresponding to the respective insertion holes in the holder plate, wherein when the adapter members are positioned, the connector can be inserted into the adapter member with the end portion of the ferrule inserted into the insertion hole, and the connector can be pulled out therefrom; and
    a fixing member that fixes the adapter members to the holder plate at the positioned locations,
    wherein the number of the adapter members positioned in rows near the center of the area of the holder plate is relatively large and the length of the rows is relatively long, while the number thereof positioned in rows near the outside of the area of the holder plate is relatively small and the length of the rows is relatively short, wherein the fixing member includes:
    a relatively long fixing member that fixes the adapter members positioned in rows near the center of the area of the holder plate to the holder plate in a unit of row; and
    a relatively short fixing member that fixes the adapter members positioned in rows near the outside of the area of the holder plate to the holder plate in a unit of row.

* * * * *